Feb. 6, 1934.     E. T. PETRAK     1,946,357
VEHICLE SPRING
Filed Aug. 16, 1932
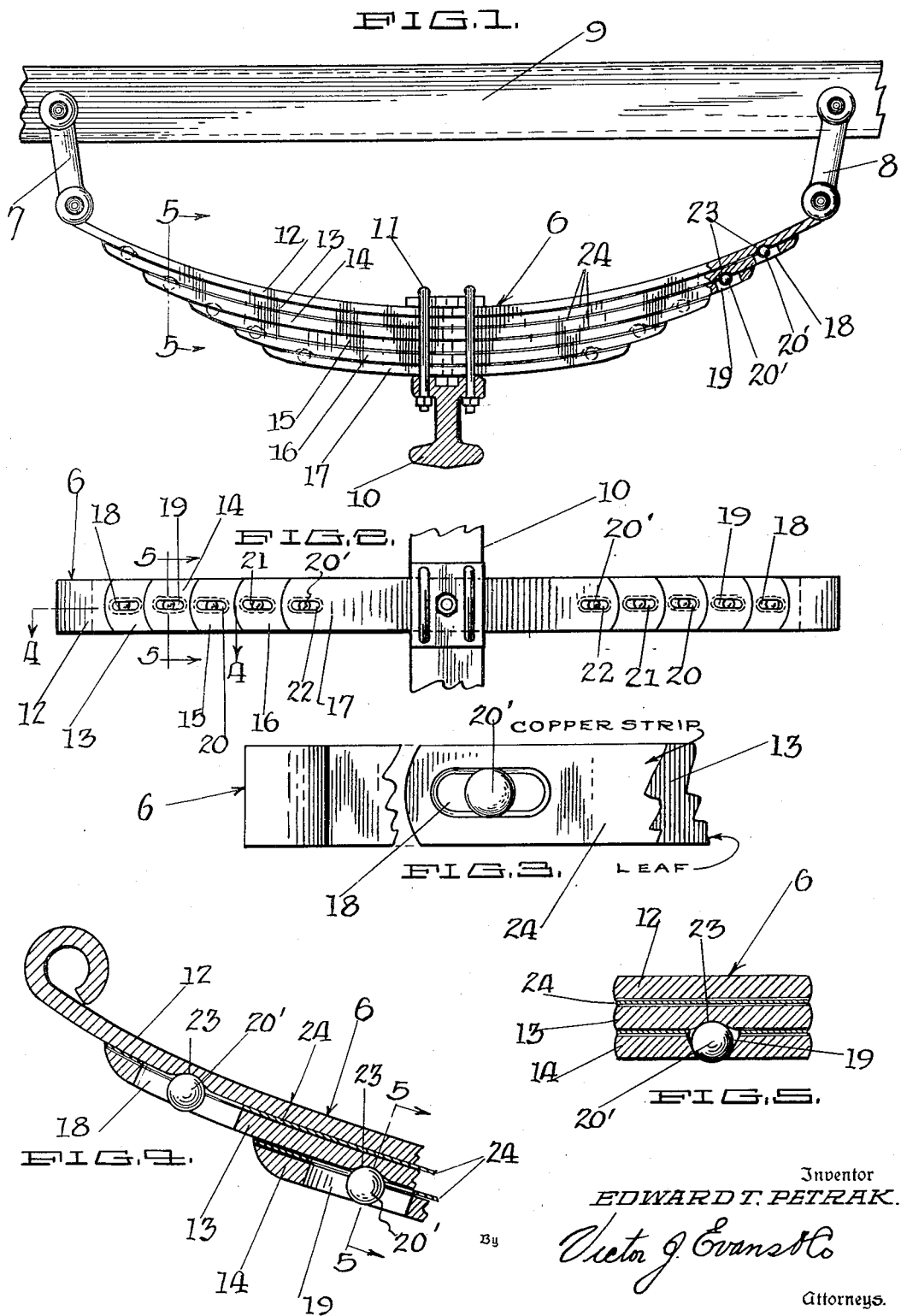
Inventor
EDWARD T. PETRAK.
By Victor J. Evans & Co
Attorneys.

Patented Feb. 6, 1934

1,946,357

UNITED STATES PATENT OFFICE 1,946,357

VEHICLE SPRING

Edward T. Petrak, Quincy, Wash.

Application August 16, 1932. Serial No. 629,055

1 Claim. (Cl. 267—49)

The present invention relates generally to new and useful improvements in vehicle springs and has particular reference to an improvement in motor vehicle springs adapted to render the same more elastic or resilient by the employment of anti-friction means arranged between the leaves of the spring to relieve the independent leaves thereof from undue frictional contact when subjected to heavy duty work over bumpy roads and highways.

Motor vehicle springs are continuously subjected to severe load strains and road shocks and while supposed to be generally well lubricated often become gummed and even rusty, which naturally often, if not invariably, shortens the life of the spring and also conveys shocks and strains to other working parts of the vehicle which adds generally to wear and tear and consequent repair costs.

The principal object of the invention is the provision of a vehicle spring of the class designated that embodies a plurality of anti-friction members arranged between the leaves thereof in such manner that the leaves have free flexing action relative to each other so that road shocks are absorbed thereby and reduced to a minimum.

A further object of the invention is to provide a vehicle spring that substantially combines a load carrying spring and a shock absorbing means for motor vehicles.

A still further object is that of providing a vehicle spring that will outlast the ordinary vehicle spring and still retain its elasticity without the excessive use of grease and the annoyance and expense attendant to the application of such grease thereto.

Additional to the foregoing objects is that of providing a vehicle spring which is noiseless, shock absorbing, reasonable of manufacture and upkeep and that will give a maximum life to all working parts of the vehicle due to its shock absorbing qualities.

Other objects and advantages will be apparent during the course of the following description.

In the accompanying drawing forming a part of this specification and in which like numerals are employed to designate like parts throughout the same, Fig. 1 is a side elevation illustrating my improved spring as it appears attached to the vehicle frame and axle in the usual manner, one end being shown in section to disclose the positioning of the anti-friction members between the various leaves constituting the spring proper, Fig. 2 is a bottom plan view of the spring illustrating the slots arranged in the ends of each leaf and which form race-ways for the balls interposed between the ends of the leaves, Fig. 3 is an enlarged fragmentary top plan view with the upper leaf of the spring broken away to show a ball and its race-way arranged in the end of the under-leaf, Fig. 4 is an enlarged sectional detail of one of the shackle ends of the spring showing the anti-friction balls arranged in successive slots or race-ways in the leaves and the recesses formed in the under sides of the leaves to retain the balls in position, and Fig. 5 is an enlarged transverse section of the leaves of the spring as indicated by the line 5—5 in Figs. 1, 2 and 4.

Referring more particularly to the drawing in which the preferred form of the invention is disclosed, my improved spring consists of the usual element 6 shackeled as at 7 and 8 to the vehicle frame 9, a portion of which is shown, said spring being mounted upon the axle 10 by means of clips 11 in the usual manner.

The spring 6, in this instance is shown constituted of several leaves 12, 13, 14, 15, 16 and 17 and the leaves 13, 14, 15, 16 and 17 are provided adjacent their outer ends with slots 18, 19, 20, 21 and 22, Figure 2, in which balls 20' are mounted, said slots, as shown in Figures 3 and 5, having oppositely inclined walls which retain the balls in place but allow of their longitudinal movement as the spring leaves flex.

The underside of each spring leaf is provided with a recess 23 and the upper spherical sections of the balls rest in said recesses and when in position space the leaves of the spring at these points approximately one-thirty-second of an inch apart so that a slight clearance exists therebetween.

Thin copper strips or liners 24, are interposed between each leaf in the spaces above described and these strips additionally prevent absolute contact of the spring leaves with each other, which tends to assist in adding resiliency to the spring and also prevents corrosion.

A greasing feature may be added, if desired, (not shown) to force grease from ball to ball to materially add to the life of all working parts but this feature is not deemed necessary in the present structure.

Under normal load strains or heavy or excessive load strains or shocks, it is obvious that the balls take and distribute the load evenly to the various leaves of the spring thereby reducing to a minimum, the bearing area of each leaf of the spring relative to its adjacent leaf, this function naturally tending to greatly reduce friction and consequently increase to a maximum the elasticity of the spring and the consequent wear and tear on the working parts of the gear and vehicle itself.

It is to be understood that the forms of my invention herewith shown and described are to be taken as preferred examples of the same and that various changes relative to the material, size, shape and arrangement of parts may be resorted to without departing from the spirit of the invention or the scope of the subjoined claim.

Having thus described my invention, I claim:—

In a motor vehicle spring of the class described, a spring element embodying a plurality of leaves, retaining slots formed through certain of said leaves, and complementary recesses formed in the super-imposed leaves and at a point adjacent said slots, the walls of said slots being inclined, anti-friction balls positioned in each of said slots and engaging said recesses, the bottom of each of said slots being free to discharge any foreign matter passing into said slots.

EDWARD T. PETRAK.